Jan. 11, 1955  C. R. UNDERHILL, JR  2,699,090
THEATER SCREEN
Filed April 24, 1952
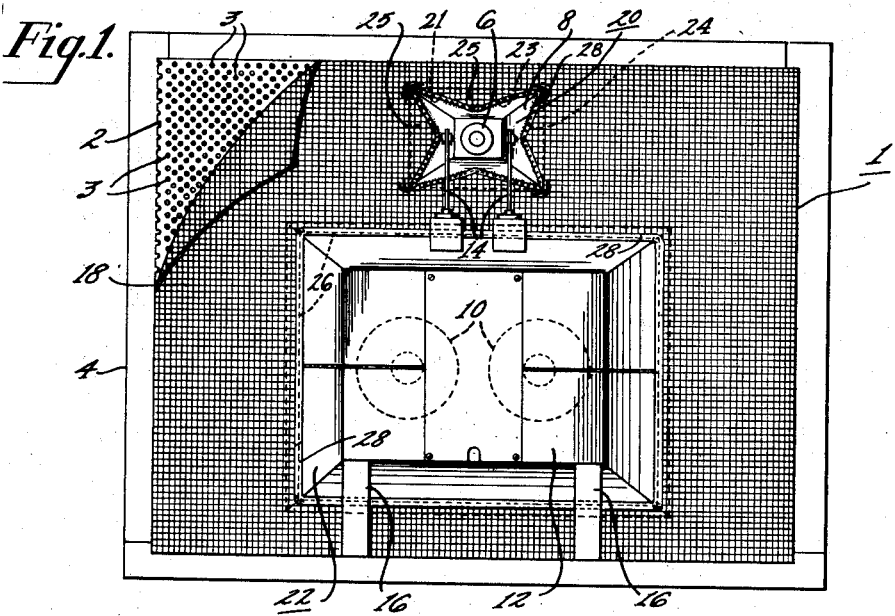
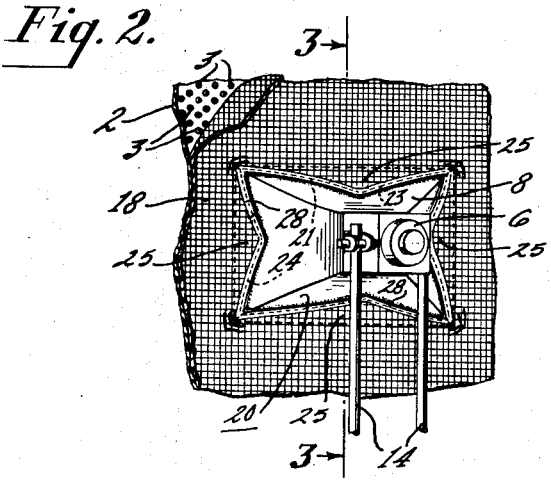
INVENTOR
Charles R. Underhill, Jr.
BY
ATTORNEY United States Patent Office 2,699,090
Patented Jan. 11, 1955

2,699,090

THEATER SCREEN

Charles R. Underhill, Jr., Haddonfield, N. J., assignor to Radio Corporation of America, a corporation of Delaware Application April 24, 1952, Serial No. 284,051

2 Claims. (Cl. 88—28.92)

The present invention relates to picture projection screens, and more particularly to projection screens of the type used for the display of sound motion pictures.

Many motion picture theaters are equipped with a projection screen which comprises, generally, a large sheet of white plastic material. To create the effect that the sounds accompanying the picture are actually coming from the picture, sound radiators are located directly behind the screen. To permit the sound waves to pass through the screen, the screen is perforated, for example, in the manner set forth in the patent issued to Albert B. Hurley, 2,133,097.

However, many theaters are air-conditioned. The air conditioning systems set up a circulation of air currents in the theaters. One result of the air circulation thus produced is to cause air to flow between the stage area and the auditorium area. When the air leaves or enters the stage area, it passes through the perforations of the conventional screen, carrying with it any dust or dirt particles that might be present. When the air passes through the perforations, some of the dirt particles are deposited on the screen in or about the perforations. The dirt particles thus deposited tend to produce an objectionable discoloration on the front surface of the screen. When the screen has been discolored, the intensity of the reflected image projected upon the screen is reduced. Further, the discoloration frequently is unevenly distributed over the face of the screen, leaving traces or outlines of any structure used in conjunction with the screen, such as the supporting structure therefor, such structures being on the back stage side of the screen.

It is, accordingly, an object of the present invention to provide an improved projection screen for theaters which will be free from the aforementioned and other objectionable characteristics of prior art screens.

It is another object of this invention to provide an improved screen, as set forth, which is characterized in that it is perforated to permit the passage of sound energy therethrough but sealed to prevent the circulation of dirt laden air through the perforations.

It is a further object of this invention to provide an improved projection screen for theaters wherein means are provided for rendering the screen transparent to sound energy but impermeable to air currents.

In accomplishing these and other objects, there has been provided, in accordance with this invention, a perforated screen of conventional design but having a thin film of dark colored plastic material covering the back of the screen. The loud-speaker baffles, which are mounted immediately behind the screen are inserted through openings cut into the plastic film. The film is then sealed around the baffles to prevent air leaks. Thus the back of the screen is effectively sealed to prevent any dirt laden air from passing through the perforated screen and depositing dirt particles on the screen, while still exposing a sufficient area of perforations to permit free passage of sound wave energy therethrough.

A better understanding of this invention may be had from the following detailed description when read in connection with the accompanying drawings in which:

Fig. 1 is an elevational view of a screen assembly embodying the present invention as viewed from back stage.

Fig. 2 is a fragmentary, perspective view of the screen shown in Fig. 1, and

Fig. 3 is a fragmentary, side view taken along the line 3—3 of Fig. 2 and viewed in the direction of the arrows.

Referring to the drawings in more particularity, there is shown, in Fig. 1, a projection screen 1 as it would appear from back stage in a theater. The screen 2 may be of a conventional type well known in the industry, such as a plastic screen having perforations 3 therethrough. The screen 2 is supported by a suitable frame 4. Located behind the screen 2 is a loudspeaker assembly which may comprise a high frequency speaker 6 together with its associated acoustic baffle 8 and one or more low frequency speakers 10 with their associated baffle 12. Suitable supporting structure 14 and 16 is provided for the speaker assembly.

Immediately adjacent to the back surface of the screen 2, and covering the screen 2, is a thin sheet 18 of material which is impermeable to air. That is, circulating air current cannot pass through this thin sheet. This thin sheet 18 is coextensive with the back surface of the screen 2 and is sealed to the screen 2 around a closed path such as around the peripheral or marginal portion thereof, thus completely sealing it off from the air which would normally pass through the perforations 3 of the screen 2. The thin sheet or film 18 is preferably made of a flexible plastic and may be on the order of four-thousandths of an inch in thickness. The sheet 18 is also preferably black in color, as indicated by the crosshatching in the drawing, for reasons which will appear hereinafter.

In order that the sound energy from the speaker assembly may be transmitted through the perforations 3 of the screen 2 without being impeded by the thin sheet 18, suitable openings 20 and 22 are made in the thin sheet 18. One way of forming these openings is to slit the sheet 18 along an "X" or diagonals 21, 23, to provide triangular flaps 25 which may be pulled away from the screen 2 and folded back to expose desired areas of the screen 2 suitable for accommodation of the baffles 8 and 12. There should be as many openings in the film 18 as there are speaker baffles. The speaker baffles 8 and 12 are then inserted into the openings provided by the separated flaps 25 so that the open end of each of the speaker baffles projects through the film 18 to a position immediately adjacent to the back surface of the screen 2. The edges 24 and 26 of the flaps 25 are then sealed to the outer surfaces of the speaker baffles. The sealing may be accomplished by means of a suitable cement or by use of an adhesive tape 28 (shown most clearly in Fig. 3).

The baffle structures 8 and 12 are or should be air tight. Therefore, when the thin sheet 18 of impermeable material is sealed around the baffles 8 and 12 and also to the edges of the screen 2, the entire area of the screen is effectively sealed against the circulation of dirt laden air currents through the perforations 3 of the screen 2.

From the front surface, or audience side, of the screen, the screen should appear to be uniformly colored. Since sharp discontinuities in the coloration of objects on the back stage side of the screen would show through the perforations in the screen, the impermeable film 14 should be black. Since the portions of the speaker assembly exposed to the screen are most frequently black or nearly so, no perceptible discontinuity of color would be apparent from the audience side of the screen.

Thus, it may be seen that there has been provided an improved projection screen for theaters characterized in that, although the screen is perforated to permit the transmission of sound energy therethrough, dirt laden air is prevented from circulating through the perforations.

What is claimed is:

1. A projection screen assembly adapted to the exhibition of sound motion pictures, said assembly comprising, in combination, a projection screen having a front surface and a back surface, a loudspeaker assembly including baffles mounted adjacent to said back surface of said screen, said screen being perforated to permit free transmission of sound energy from said loudspeaker assembly through said screen when said perforations are exposed to the ambient at both surfaces of said screen, and a thin film of flexible material which is impermeable to air supported coextensive with and secured to said back surface of said screen along a closed path, said film being provided with openings through which said loudspeaker assembly projects, the edges of said openings being sealed to said baffles whereby dirt laden air is prevented from circulating through the perforations of said screen.

2. The invention as set forth in claim 1 wherein said openings in said thin film are diagonal slits cut into said film at the desired position of said speaker assembly.

References Cited in the file of this patent

UNITED STATES PATENTS

| | | |
|---|---|---|
| 2,216,901 | Bodde | Oct. 8, 1940 |
| 2,238,365 | Hurley | Apr. 15, 1941 |

FOREIGN PATENTS

| | | |
|---|---|---|
| 327,919 | Great Britain | Apr. 17, 1930 |